(12) United States Patent
Wang et al.

(10) Patent No.: US 11,249,598 B2
(45) Date of Patent: Feb. 15, 2022

(54) INTEGRATED FINGERPRINT DETECTION TOUCH CONTROL DISPLAY APPARATUS AND INTEGRATED METHOD OF FINGERPRINT DETECTION, TOUCH CONTROL, AND IMAGE DISPLAY

(71) Applicant: BOE Technology Group Co., Ltd., Beijing (CN)

(72) Inventors: Lei Wang, Beijing (CN); Haisheng Wang, Beijing (CN); Xiaoliang Ding, Beijing (CN); Yingming Liu, Beijing (CN); Xueyou Cao, Beijing (CN); Xiaoquan Hai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 317 days.

(21) Appl. No.: 16/484,326

(22) PCT Filed: Sep. 13, 2018

(86) PCT No.: PCT/CN2018/105511
§ 371 (c)(1),
(2) Date: Aug. 7, 2019

(87) PCT Pub. No.: WO2020/051840
PCT Pub. Date: Mar. 19, 2020

(65) Prior Publication Data
US 2021/0333926 A1 Oct. 28, 2021

(51) Int. Cl.
*G06F 3/042* (2006.01)
*G06K 9/20* (2006.01)
(Continued)

(52) U.S. Cl.
CPC .......... *G06F 3/0421* (2013.01); *G06F 3/0412* (2013.01); *G06K 9/0004* (2013.01); *G06K 9/209* (2013.01)

(58) Field of Classification Search
None
See application file for complete search history.

(56) References Cited

U.S. PATENT DOCUMENTS

| 2006/0001635 A1* | 1/2006 | Nakajima | G09G 3/3677 345/98 |
| 2008/0122803 A1* | 5/2008 | Izadi | G06F 3/0421 345/175 |

(Continued)

*Primary Examiner* — Chad M Dicke
(74) *Attorney, Agent, or Firm* — Intellectual Valley Law, P.C.

(57) ABSTRACT

The present application provides an integrated fingerprint detection touch control display apparatus. The integrated fingerprint detection touch control display apparatus includes a plurality of fingerprint sensing driver circuits respectively configured to independently control fingerprint detection respectively in a plurality of sensing regions in the integrated fingerprint detection touch control display apparatus; a touch sensing driver circuit configured to control touch detection in the integrated fingerprint detection touch control display apparatus; a counter substrate; and an array substrate facing the counter substrate. The array substrate includes a plurality of light sources; a plurality of photosensors; a plurality of photosensor driving thin film transistors respectively connected to the plurality of photosensors; a plurality of first gate lines respectively connected to the plurality of fingerprint sensing driver circuits; and a plurality of second gate lines connected to the touch sensing driver circuit for detecting a touch.

20 Claims, 9 Drawing Sheets

(51) Int. Cl.
*G06K 9/00* (2006.01)
*G06F 3/041* (2006.01)

(56) References Cited

U.S. PATENT DOCUMENTS

| | | | |
|---|---|---|---|
| 2014/0062961 A1* | 3/2014 | Kao | G06F 3/042 |
| | | | 345/175 |
| 2016/0042215 A1* | 2/2016 | Wang | G06K 9/00087 |
| | | | 382/124 |
| 2018/0150165 A1* | 5/2018 | Kim | G06F 3/042 |
| 2018/0173923 A1* | 6/2018 | Lee | G06K 9/0004 |

* cited by examiner

INTEGRATED FINGERPRINT DETECTION TOUCH CONTROL DISPLAY APPARATUS AND INTEGRATED METHOD OF FINGERPRINT DETECTION, TOUCH CONTROL, AND IMAGE DISPLAY

CROSS-REFERENCE TO RELATED APPLICATION

This application is a national stage application under 35 U.S.C. § 371 of International Application No. PCT/CN2018/105511, filed Sep. 13, 2018, the contents of which are incorporated by reference in the entirety.

TECHNICAL FIELD

The present invention relates to display technology, more particularly, to an integrated fingerprint detection touch control display apparatus and an integrated method of fingerprint detection, touch control, and image display.

BACKGROUND

In recent years, various methods have been proposed in fingerprint and palm print recognition. Examples of optical method for recognizing fingerprint and palm print include total reflection method, light-path separation method, and scanning method. In a total reflection method, light from a light source such as ambient light enters into a pixel, and is totally reflected on the surface of a package substrate. When a finger or palm touches the display panel, the total reflection condition of the surface changes locally upon touch, leading to a disruption of the total reflection locally. The disruption of the total reflection results in a reduced reflection. Based on this principle, the ridge lines of a finger may be differentiated from the valley lines. Alternatively, fingerprint and palm print may be recognized by detecting changes in capacitance when a finger or palm touches the display panel.

SUMMARY

In one aspect, the present invention provides an integrated fingerprint detection touch control display apparatus, comprising a plurality of fingerprint sensing driver circuits respectively configured to independently control fingerprint detection respectively in a plurality of sensing regions in the integrated fingerprint detection touch control display apparatus; a touch sensing driver circuit configured to control touch detection in the integrated fingerprint detection touch control display apparatus; a counter substrate; and an array substrate facing the counter substrate; wherein the array substrate comprises a plurality of light sources configured to emit light toward the counter substrate, at least a portion of the light being totally reflected by a surface of the counter substrate facing away the array substrate; a plurality of photosensors configured to detect the at least the portion of the light being totally reflected by the surface of the counter substrate facing away the array substrate, thereby detecting a fingerprint information; a plurality of photosensor driving thin film transistors respectively connected to the plurality of photosensors, the plurality of photosensor driving thin film transistors and the plurality of photosensors being arranged in a plurality of rows; and a plurality of gate scanning lines respectively connected to the plurality of rows of the plurality of photosensor driving thin film transistors for providing gate scanning signals to the plurality of photosensor driving thin film transistors; and wherein the plurality of gate scanning lines comprise a plurality of first gate lines respectively connected to the plurality of fingerprint sensing driver circuits for independently detecting fingerprint information in each of the plurality of sensing regions, and a plurality of second gate lines connected to the touch sensing driver circuit for detecting a touch.

Optionally, gate lines of the plurality of first gate lines passing through a same one of the plurality of sensing regions are connected to a same one of the plurality of fingerprint sensing driver circuits; and gate lines of the plurality of first gate lines passing through different ones of the plurality of sensing regions are respectively connected to different ones of the plurality of fingerprint sensing driver circuits.

Optionally, the plurality of second gate lines are respectively from the plurality of sensing regions, each of the plurality of sensing regions having at least one of the plurality of second gate lines passing there-through.

Optionally, multiple ones of the plurality of photosensors corresponding to the plurality of second gate lines are configured to detect the touch by detecting an image of a touch object using ambient light as a light source.

Optionally, multiple ones of the plurality of photosensors corresponding to the plurality of second gate lines are configured to detect the touch by detecting an image of a touch object using light emitted from multiple ones of the plurality of light sources as a light source.

Optionally, the integrated fingerprint detection touch control display apparatus is operated in a time-division mode comprising a display mode and a touch sensing mode; the integrated fingerprint detection touch control display apparatus is configured to display an image during the display mode; and the plurality of light sources are configured to display an image having a grayscale higher than a threshold value for providing light for detecting the image of the touch object.

Optionally, the integrated fingerprint detection touch control display apparatus further comprises one or more light sensors configured to detect a light intensity of ambient light; wherein, in response to the light intensity of ambient light being no less than a threshold value, multiple ones of the plurality of photosensors corresponding to the plurality of second gate lines are configured to detect the touch by detecting an image of a touch object using ambient light as a light source; and wherein, in response to the light intensity of ambient light being below a threshold value, multiple ones of the plurality of photosensors corresponding to the plurality of second gate lines are configured to detect the touch by detecting an image of a touch object using light emitted from multiple ones of the plurality of light sources as a light source.

Optionally, the integrated fingerprint detection touch control display apparatus further comprises a processor configured to determine a touch region in which the touch occurs, and determine one or more active fingerprint sensing driver circuits out of the plurality of fingerprint sensing driver circuits, each of the one or more active fingerprint sensing driver circuits is connected to at least one gate line of the plurality of first gate lines passing through the touch region; wherein the one or more active fingerprint sensing driver circuits are configured to provide gate scanning signals to multiple rows of the plurality rows of the plurality of photosensor driving thin film transistors connected to the one or more active fingerprint sensing driver circuits.

Optionally, the processor is further configured to determine one or more idle fingerprint sensing driver circuits out of the plurality of fingerprint sensing driver circuits, gate lines connected to the one or more idle fingerprint sensing driver circuits passing through a region outside the touch region; wherein the one or more idle fingerprint sensing driver circuits are configured not to provide gate scanning signals.

Optionally, the plurality of sensing regions are sequentially arranged along a direction perpendicular to the plurality of gate scanning lines.

Optionally, the plurality of second gate lines are respectively further connected to the plurality of fingerprint sensing driver circuits; wherein the integrated fingerprint detection touch control display apparatus is operated in a time-division mode comprising a touch sensing mode and a fingerprint detection mode; the plurality of second gate lines in the touch sensing mode are configured to detect a touch; and the plurality of first gate lines and the plurality of second gate lines in the fingerprint detection mode are configured to detect fingerprint information.

Optionally, the plurality of light sources are a plurality of light emitting elements in the integrated fingerprint detection touch control display apparatus; wherein the integrated fingerprint detection touch control display apparatus is operated in a time-division mode comprising a display mode and a fingerprint detection mode; the plurality of light emitting elements are configured to display an image during the display mode; and one or more of the plurality of light emitting elements are configured to provide a light source for one or more of the plurality of photosensors in the fingerprint detection mode.

In another aspect, the present invention provides an integrated method of fingerprint detection, touch control, and image display, comprising independently controlling fingerprint detection respectively in a plurality of sensing regions in an integrated fingerprint detection touch control display apparatus by a plurality of fingerprint sensing driver circuits respectively; and controlling touch detection in the integrated fingerprint detection touch control display apparatus by a touch sensing driver circuit; wherein independently controlling fingerprint detection and controlling touch detection comprise emitting light using a plurality of light sources in an array substrate of the integrated fingerprint detection touch control display apparatus toward a counter substrate facing the array substrate, at least a portion of the light being totally reflected by a surface of the counter substrate facing away the array substrate; detecting the at least the portion of the light being totally reflected by the surface of the counter substrate facing away the array substrate using a plurality of photosensors, thereby detecting a fingerprint information; and providing gate scanning signals respectively to a plurality of rows of a plurality of photosensor driving thin film transistors respectively connected to the plurality of photosensors in the plurality of rows; wherein providing gate scanning signals comprises providing gate scanning signals from the plurality of fingerprint sensing driver circuits respectively through a plurality of first gate lines of the plurality of gate scanning lines, for independently detecting fingerprint information in each of the plurality of sensing regions; and providing second gate scanning signals from the touch sensing driver circuit to a plurality of second gate lines of the plurality of gate scanning lines respectively, for detecting a touch.

Optionally, gate scanning signals from a same one of the plurality of fingerprint sensing driver circuits are provided to gate lines of the plurality of first gate lines passing through a same one of the plurality of sensing regions; and gate scanning signals from different ones of the plurality of fingerprint sensing driver circuits are provided to gate lines of the plurality of first gate lines passing through different ones of the plurality of sensing regions.

Optionally, the second gate scanning signals are provided to the plurality of second gate lines respectively in the plurality of sensing regions, each of the plurality of sensing regions having at least one of the plurality of second gate lines passing there-through.

Optionally, detecting the touch comprises detecting an image of a touch object by multiple ones of the plurality of photosensors corresponding to the plurality of second gate lines using ambient light as a light source.

Optionally, detecting the touch comprises detecting an image of a touch object by multiple ones of the plurality of photosensors corresponding to the plurality of second gate lines using light emitted from multiple ones of the plurality of light sources as a light source.

Optionally, the method further comprises operating the integrated fingerprint detection touch control display apparatus in a time-division mode comprising a display mode and a touch sensing mode; displaying an image during the display mode; and displaying an image having a grayscale higher than a threshold value by the plurality of light sources for providing light for detecting the image of the touch object.

Optionally, the method further comprises detecting a light intensity of ambient light by one or more light sensors; in response to the light intensity of ambient light being no less than a threshold value, detecting an image of a touch object by multiple ones of the plurality of photosensors corresponding to the plurality of second gate lines using ambient light as a light source; and in response to the light intensity of ambient light being below a threshold value, detecting an image of a touch object using light emitted from multiple ones of the plurality of light sources as a light source by multiple ones of the plurality of photosensors corresponding to the plurality of second gate lines.

Optionally, subsequent to detecting the touch, the method further comprises determining a touch region in which the touch occurs; determining one or more active fingerprint sensing driver circuits out of the plurality of fingerprint sensing driver circuits, each of the one or more active fingerprint sensing driver circuits is connected to at least one gate line of the plurality of first gate lines passing through the touch region; and providing gate scanning signals by the one or more active fingerprint sensing driver circuits to multiple rows of the plurality rows of the plurality of photosensor driving thin film transistors connected to the one or more active fingerprint sensing driver circuits.

Optionally, the method further comprises determining one or more idle fingerprint sensing driver circuits out of the plurality of fingerprint sensing driver circuits, gate lines connected to the one or more idle fingerprint sensing driver circuits passing through a region outside the touch region; wherein the one or more idle fingerprint sensing driver circuits are configured not to provide gate scanning signals.

Optionally, the method further comprises operating the integrated fingerprint detection touch control display apparatus in a time-division mode comprising a touch sensing mode and a fingerprint detection mode; wherein providing the second gate scanning signals from the touch sensing driver circuit is performed in the touch sensing mode; and providing the gate scanning signals from the plurality of fingerprint sensing driver circuits is performed in the fingerprint detection mode; wherein providing the gate scanning signals from the plurality of fingerprint sensing driver circuits comprises providing the gate scanning signals from the plurality of fingerprint sensing driver circuits respectively through the plurality of first gate lines and the plurality of second gate lines of the plurality of gate scanning lines, for independently detecting fingerprint information in each of the plurality of sensing regions.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an integrated fingerprint detection touch control display apparatus and an integrated method of fingerprint detection, touch control, and image display that substantially obviate one or more of the problems due to limitations and disadvantages of the related art. In one aspect, the present disclosure provides an integrated fingerprint detection touch control display apparatus. In some embodiments, the integrated fingerprint detection touch control display apparatus includes a display panel, a plurality of fingerprint sensing driver circuits, and a touch sensing driver circuit. The plurality of fingerprint sensing driver circuits are respectively configured to independently control fingerprint detection respectively in a plurality of sensing regions in the integrated fingerprint detection touch control display apparatus. The touch sensing driver circuit is configured to control touch detection in the integrated fingerprint detection touch control display apparatus. The display panel includes a counter substrate and an array substrate facing the counter substrate. Optionally, the array substrate includes a plurality of light sources configured to emit light toward the counter substrate, at least a portion of the light being totally reflected by a surface of the counter substrate facing away the array substrate; a plurality of photosensors configured to detect the at least the portion of the light being totally reflected by the surface of the counter substrate facing away the army substrate, thereby detecting a fingerprint information; a plurality of photosensor driving thin film transistors respectively connected to the plurality of photosensors, the plurality of photosensor driving thin film transistors and the plurality of photosensors being arranged in a plurality of rows; and a plurality of gate scanning lines respectively connected to the plurality of rows of the plurality of photosensor driving thin film transistors for providing gate scanning signals to the plurality of photosensor driving thin film transistors. Optionally, the plurality of gate scanning lines include a plurality of first gate lines respectively connected to the plurality of fingerprint sensing driver circuits for independently detecting fingerprint information in each of the plurality of sensing regions, and a plurality of second gate lines connected to the touch sensing driver circuit for detecting a touch.

Figure 1:
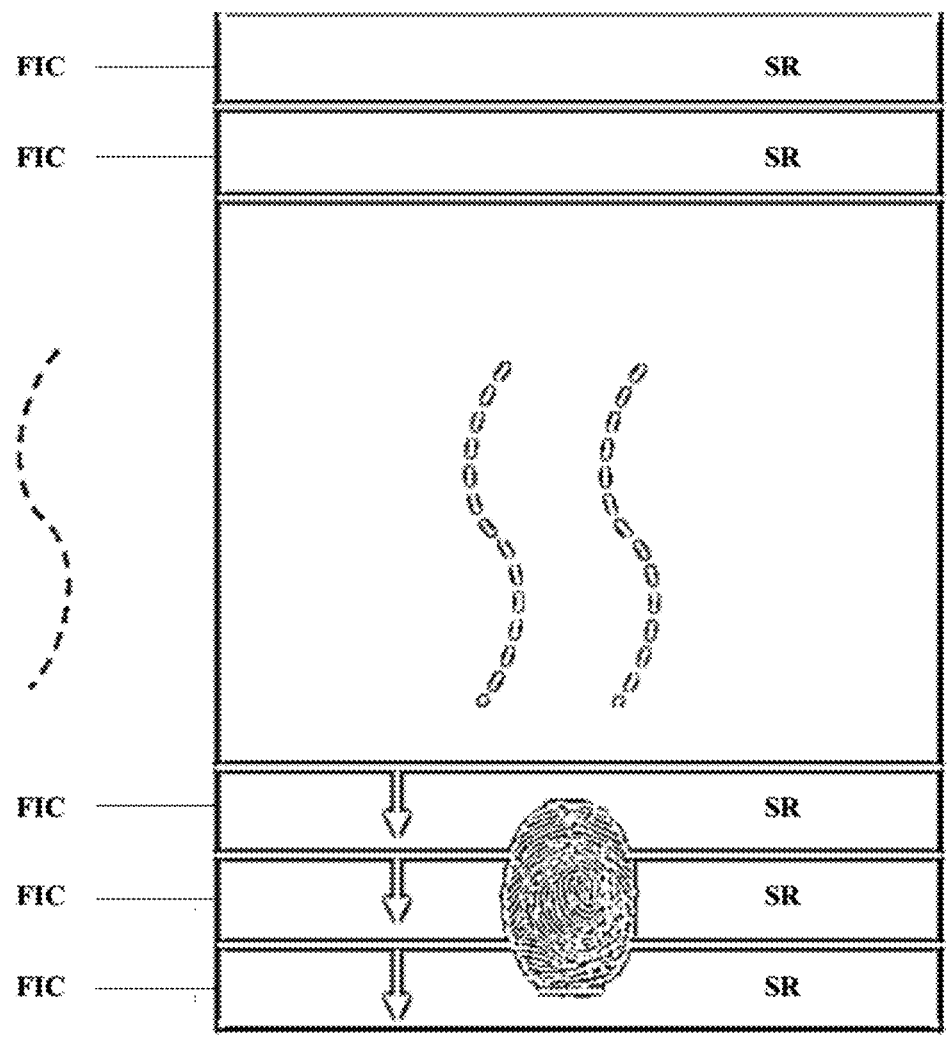
FIG. 1 is a schematic diagram illustrating the structure of an integrated fingerprint detection touch control display apparatus in some embodiments according to the present disclosure.

FIG. 1 is a schematic diagram illustrating the structure of an integrated fingerprint detection touch control display apparatus in some embodiments according to the present disclosure. Referring to FIG. 1, the present integrated fingerprint detection touch control display apparatus in some embodiments has a plurality of sensing regions SR. Fingerprint detection in each of the plurality of sensing regions SR can be independently performed. For example, in some embodiments, the integrated fingerprint detection touch control display apparatus includes a plurality of fingerprint sensing driver circuits FIC respectively configured to independently control fingerprint detection respectively in the plurality of sensing regions SR in the integrated fingerprint detection touch control display apparatus. Each individual one of the plurality of fingerprint sensing driver circuits FIC is configured to control fingerprint detection in a respective one of the plurality of sensing regions SR in the integrated fingerprint detection touch control display apparatus. In one example, as shown in FIG. 1, a fingerprint spans across three directly adjacent consecutive sensing regions of the plurality of sensing regions SR in the integrated fingerprint detection touch control display apparatus. Three independent fingerprint sensing driver circuits of the plurality of fingerprint sensing driver circuits FIC are configured to independently detect fingerprint information (or other biometric information such as palmprint information) in three directly adjacent consecutive sensing regions of the plurality of sensing regions SR in the integrated fingerprint detection touch control display apparatus. The fingerprint sensing driver circuits of the plurality of fingerprint sensing driver circuits FIC in other sensing regions of the plurality of sensing regions SR can be in an idle state, thereby reducing power consumption, computational demand, and making the fingerprint detection faster and more accurate.

Figure 2:
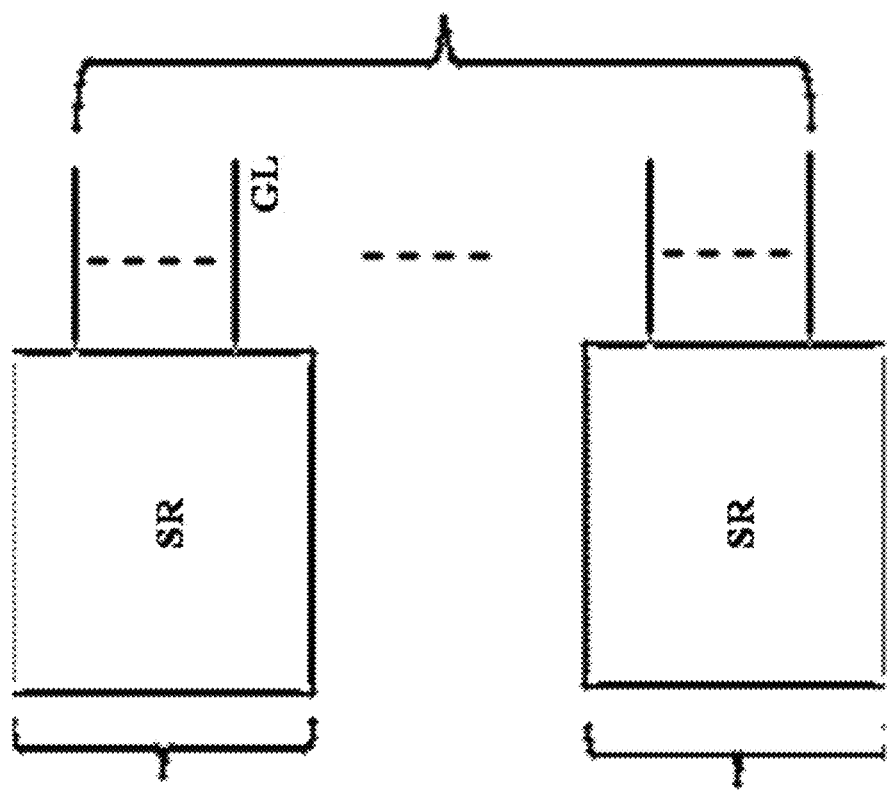
FIG. 2 is a schematic diagram illustrating the structure of an integrated fingerprint detection touch control display apparatus in some embodiments according to the present disclosure.

FIG. 2 is a schematic diagram illustrating the structure of an integrated fingerprint detection touch control display apparatus in some embodiments according to the present disclosure. Referring to FIG. 2, the present integrated fingerprint detection touch control display apparatus in some embodiments further includes a touch sensing driver circuit TIC configured to control touch detection in the integrated fingerprint detection touch control display apparatus. The touch sensing driver circuit TIC are connected to a plurality of gate scanning lines GL for detecting a touch. As shown in FIG. 2, the plurality of gate scanning lines GL are respectively from the plurality of sensing regions SR, each of the plurality of sensing regions SR having at least one of the plurality of gate scanning lines GL passing there-through and connected to the touch sensing driver circuit TIC.

Figure 3A:
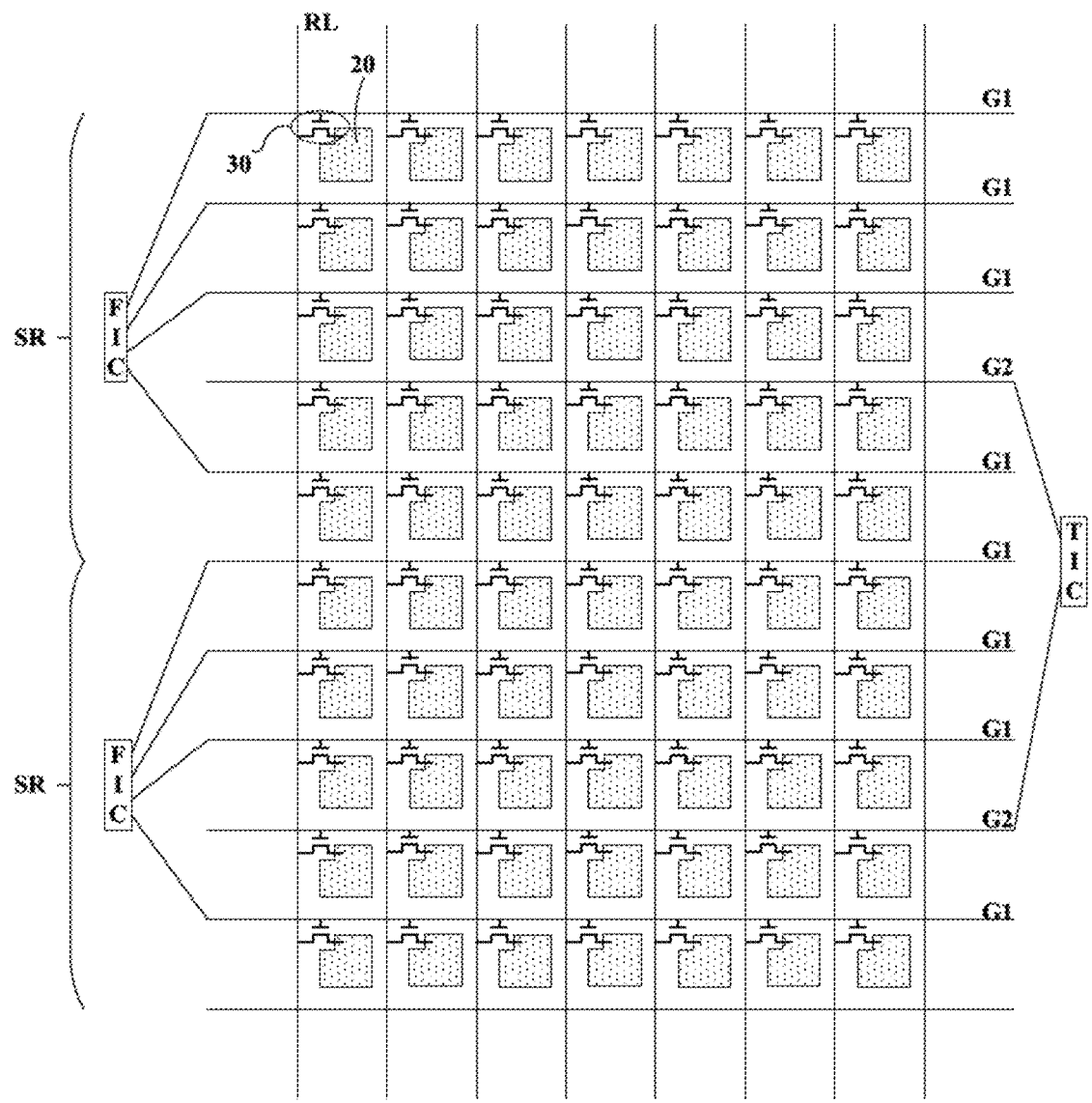
FIG. 3A is a schematic diagram illustrating the structure of an integrated fingerprint detection touch control display apparatus in some embodiments according to the present disclosure.

FIG. 3A is a schematic diagram illustrating the structure of an integrated fingerprint detection touch control display apparatus in some embodiments according to the present disclosure. Referring to FIG. 3A, the integrated fingerprint detection touch control display apparatus in some embodiments has a plurality of sensing regions SR. The integrated fingerprint detection touch control display apparatus in some embodiments includes a plurality of fingerprint sensing driver circuits FIC respectively configured to independently control fingerprint detection respectively in the plurality of sensing regions SR in the integrated fingerprint detection touch control display apparatus; and a touch sensing driver circuit TIC configured to control touch detection in the integrated fingerprint detection touch control display apparatus. The integrated fingerprint detection touch control display apparatus in some embodiments further includes a plurality of photosensors 20 and a plurality of photosensor driving thin film transistors 30 respectively connected to the plurality of photosensors 20. Each of the plurality of photosensors 20 is connected to a respective one of the plurality of photosensor driving thin film transistors 30, e.g., in a one-to-one correspondence relationship.

In some embodiments, the plurality of photosensor driving thin film transistors 30 and the plurality of photosensors 20 are arranged in an array having a plurality of rows and a plurality of columns. The integrated fingerprint detection touch control display apparatus in some embodiments further includes a plurality of gate scanning lines respectively connected to the plurality of rows of the plurality of photosensor driving thin film transistors 30 for providing gate scanning signals to the plurality of photosensor driving thin film transistors 30. Optionally, the integrated fingerprint detection touch control display apparatus further includes a plurality of read lines RL respectively connected to drain electrodes of the plurality of photosensor driving thin film transistors 30 in a respective row of the plurality rows for transmitting fingerprint information. Optionally, the plurality of read lines RL are arranged in the column direction, and the plurality of gate scanning lines are arranged in the row direction.

Referring to FIG. 3A, in some embodiments, the plurality of gate scanning lines include a plurality of first gate lines G1 respectively connected to the plurality of fingerprint sensing driver circuits FC for independently detecting fingerprint information in each of the plurality of sensing regions SR, and a plurality of second gate lines G2 connected to the touch sensing driver circuit TIC for detecting a touch. Each of the plurality of first gate lines G1 is connected to a respective row of the plurality of rows of the plurality of photosensor driving thin film transistors 30, and each of the plurality of second gate lines G2 is connected to a respective row of the plurality of rows of the plurality of photosensor driving thin film transistors 30. The plurality of first gate lines G1 and the plurality of second gate lines G2 are connected to different rows of the plurality of rows of the plurality of photosensor driving thin film transistors 30.

In some embodiments, gate lines of the plurality of first gate lines G1 passing through a same one of the plurality of sensing regions SR are connected to a same one of the plurality of fingerprint sensing driver circuits FIC, and gate lines of the plurality of first gate lines G1 passing through different ones of the plurality of sensing regions SR are respectively connected to different ones of the plurality of fingerprint sensing driver circuits FIC. Thus, each individual one of the plurality of fingerprint sensing driver circuits FIC is configured to independently control fingerprint detection in a respective one of the plurality of sensing regions SR. Optionally, each individual one of the plurality of fingerprint sensing driver circuits FIC is connected to multiple rows of the plurality of rows of the plurality of photosensor driving thin film transistors 30. Different fingerprint sensing driver circuits of the plurality of fingerprint sensing driver circuits FIC are connected to different rows of the plurality of rows of the plurality of photosensor driving thin film transistors 30. Optionally, different fingerprint sensing driver circuits of the plurality of fingerprint sensing driver circuits FIC do not share any common gate lines and do not share any common rows of the plurality of rows of the plurality of photosensor driving thin film transistors 30.

Optionally, the plurality of fingerprint sensing driver circuits FTC are a plurality of gate-on-array circuits. Optionally, the touch sensing driver circuit TIC is a gate-on-array circuit.

Referring to FIGS. 1, 2, and 3A, in some embodiments, the plurality of sensing regions SR are sequentially and consecutively arranged along a direction perpendicular to the plurality of gate scanning lines (e.g., along the column direction).

In some embodiments, the plurality of read lines RL include a plurality of first read lines and a plurality of second read lines. Optionally, the plurality of first read lines are respectively connected to drain electrodes of the plurality of photosensor driving thin film transistors 30 connected to the plurality of first gate lines G1. Optionally, the plurality of second read lines are respectively connected to drain electrodes of the plurality of photosensor driving thin film transistors 30 connected to the plurality of second gate lines G2.

Figure 3B:
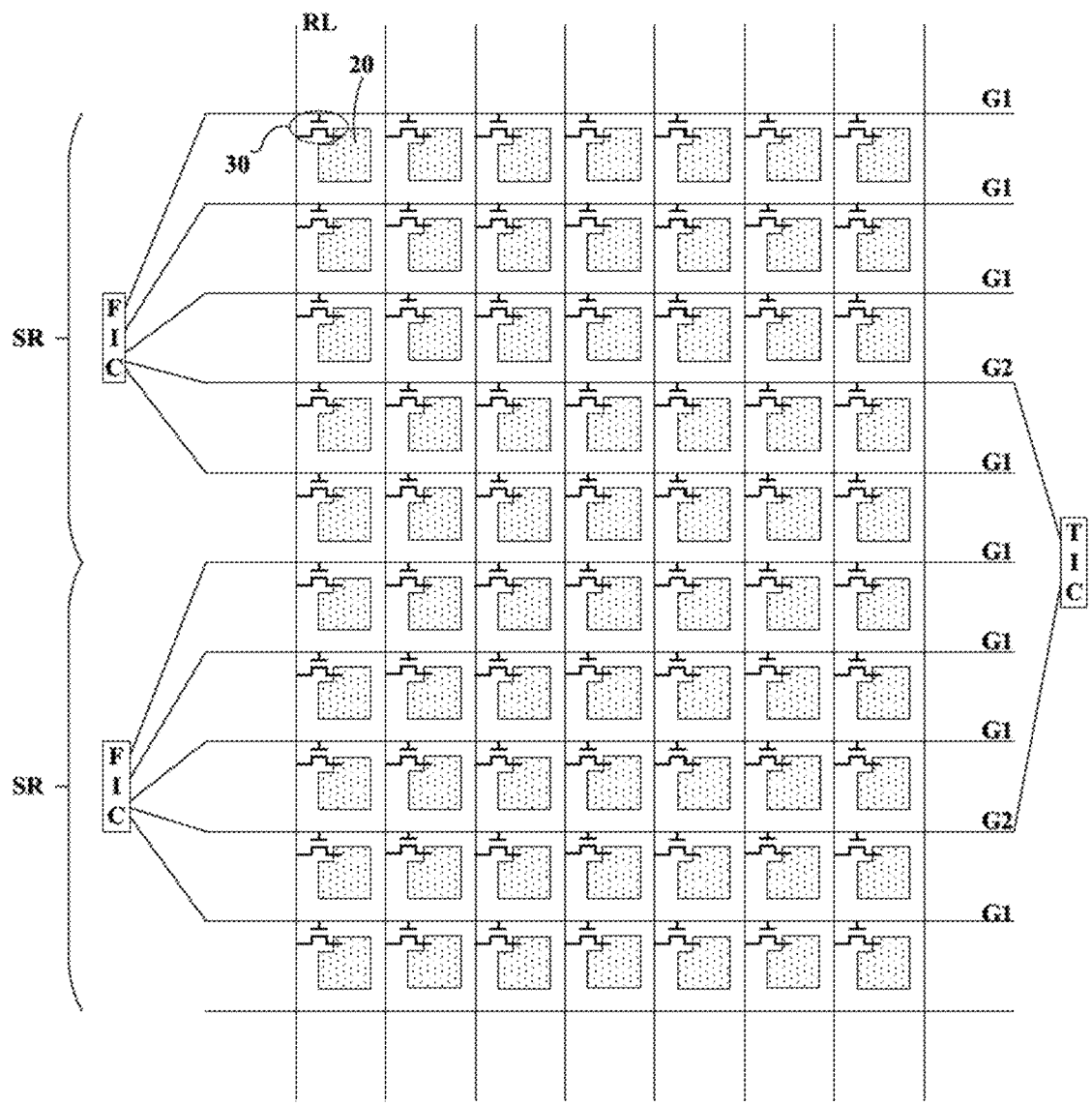
FIG. 3B is a schematic diagram illustrating the structure of an integrated fingerprint detection touch control display apparatus in some embodiments according to the present disclosure.

FIG. 3B is a schematic diagram illustrating the structure of an integrated fingerprint detection touch control display apparatus in some embodiments according to the present disclosure. Referring to FIG. 3B, the plurality of gate scanning lines include a plurality of first gate lines G1 and a plurality of second gate lines G2. Each of the plurality of first gate lines G1 is connected to a respective row of the plurality of rows of the plurality of photosensor driving thin film transistors 30, and each of the plurality of second gate lines G2 is connected to a respective row of the plurality of rows of the plurality of photosensor driving thin film transistors 30. The plurality of first gate lines G1 and the plurality of second gate lines G2 are connected to different rows of the plurality of rows of the plurality of photosensor driving thin film transistors 30. The plurality of first gate lines G1 and the plurality of second gate lines G2 are respectively connected to the plurality of fingerprint sensing driver circuits FTC for independently detecting fingerprint information in each of the plurality of sensing regions SR. The plurality of second gate lines G2 are connected to the touch sensing driver circuit TIC for detecting a touch. Each of the plurality of second gate lines G2 is connected to a respective one of the plurality of fingerprint sensing driver circuits FIC in a respective one of the plurality of sensing regions SR, and connected to the touch sensing driver circuit TIC.

In some embodiments, the integrated fingerprint detection touch control display apparatus is operated in a time-division mode. The time-division mode includes a touch sensing mode and a fingerprint detection mode. Optionally, the time-division mode further includes a display mode. A plurality of light sources (e.g., a plurality of light emitting elements) are configured to display an image during the display mode. Optionally, one or more of the plurality of light sources (e.g., the plurality of light emitting elements) are configured to provide a light source for one or more of the plurality of photosensors 20 in the fingerprint detection mode and optionally in the touch sensing mode. In the touch sensing mode, the plurality of second gate lines G2 and associated rows of the plurality of rows of the plurality of photosensor driving thin film transistors 30 are configured to detect a touch. In the fingerprint detection mode, the plurality of second gate lines G2 and associated rows of the plurality of rows of the plurality of photosensor driving thin film transistors 30 are configured to detect fingerprint information.

In some embodiments, gate lines of the plurality of first gate lines G1 and the plurality of second gate lines G2 passing through a same one of the plurality of sensing regions SR are connected to a same one of the plurality of fingerprint sensing driver circuits FIC, and gate lines of the plurality of first gate lines G1 and the plurality of second gate lines G2 passing through different ones of the plurality of sensing regions SR are respectively connected to different ones of the plurality of fingerprint sensing driver circuits FIC. Each individual one of the plurality of fingerprint sensing driver circuits FIC is configured to independently control fingerprint detection in a respective one of the plurality of sensing regions SR. Optionally, each individual one of the plurality of fingerprint sensing driver circuits FIC is connected to multiple rows of the plurality of rows of the plurality of photosensor driving thin film transistors 30. Different fingerprint sensing driver circuits of the plurality of fingerprint sensing driver circuits FIC are connected to different rows of the plurality of rows of the plurality of photosensor driving thin film transistors 30. Optionally, different fingerprint sensing driver circuits of the plurality of fingerprint sensing driver circuits FIC do not share any common gate lines and do not share any common rows of the plurality of rows of the plurality of photosensor driving thin film transistors 30.

Referring to FIG. 3A and FIG. 3B, in some embodiments, the plurality of second gate lines G2 have a same distribution pattern in the plurality of sensing regions SR. In one example, the plurality of first gate lines G1 and the plurality of second gate lines G2 have a same distribution pattern in the plurality of sensing regions SR. In another example, multiple ones of the plurality of first gate lines G1 and one or more of the plurality of second gate lines G2 are arranged in a same pattern in each individual one of the plurality of sensing regions SR. In another example, two adjacent second gate lines of the plurality of second gate lines G2 respectively from two adjacent sensing regions of the plurality of sensing regions SR are spaced apart by a same distance (e.g., spaced apart by a same number of gate lines of the plurality of first gate lines G1) throughout the integrated fingerprint detection touch control display apparatus. In another example, two adjacent second gate lines of the plurality of second gate lines G2 in a same sensing region of the plurality of sensing regions SR are spaced apart by a same distance (e.g., spaced apart by a same number of gate lines of the plurality of first gate lines G) throughout the integrated fingerprint detection touch control display apparatus.

Figure 4:
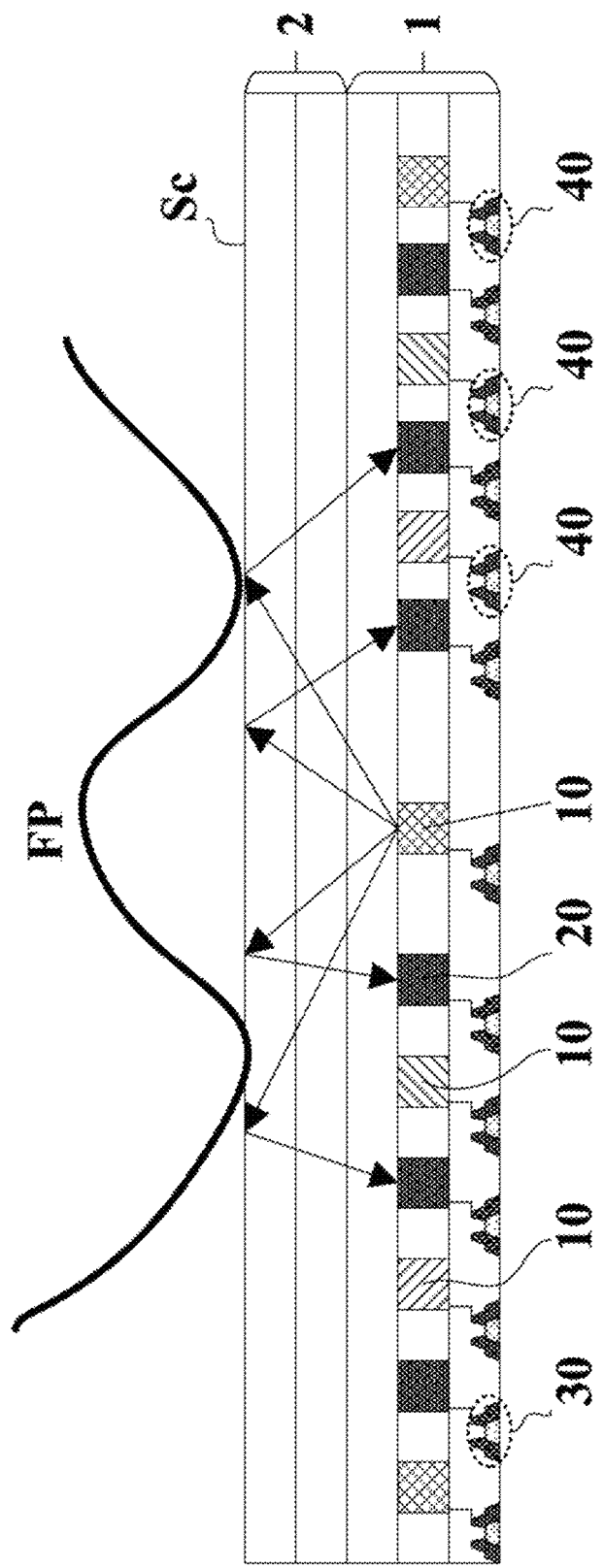
FIG. 4 is a cross-sectional view of a display panel in an integrated fingerprint detection touch control display apparatus in some embodiments according to the present disclosure.

FIG. 4 is a cross-sectional view of a display panel in an integrated fingerprint detection touch control display apparatus in some embodiments according to the present disclosure. Referring to FIG. 4, the display panel in some embodiments includes an array substrate 1 and a counter substrate 2 facing the array substrate 1. The array substrate 1 in some embodiments includes a plurality of light sources 10 configured to emit light toward the counter substrate 2, at least a portion of the light being totally reflected by a surface Sc of the counter substrate 2 facing away the array substrate 1. The array substrate 1 further includes a plurality of photosensors 20 configured to detect the at least the portion of the light being totally reflected by the surface Sc of the counter substrate 2 facing away the array substrate 1, thereby detecting a fingerprint FP information. The array substrate 1 further includes a plurality of photosensor driving thin film transistors 30 respectively connected to the plurality of photosensors 20. Optionally, the array substrate 1 further includes a plurality of light emitting driving thin film transistors 40 respectively connected to the plurality of light sources 10 for controlling light emission of the plurality of light sources 10. The plurality of light sources 10 may emit monochromic light. Optionally, the plurality of light sources 10 are respectively configured to emit different light of different colors. In one example, the plurality of light sources 10 includes multiple red light sources emitting red light, multiple green light sources emitting green light, and multiple blue light sources emitting blue light.

In some embodiments, the plurality of light sources 10 area plurality of light emitting elements in the integrated fingerprint detection touch control display apparatus. Various appropriate light emitting elements may be used in the present display apparatus. Examples of appropriate light emitting elements include an organic light emitting diode, a quantum dots light emitting diode, and a micro light emitting diode.

In some embodiments, the integrated fingerprint detection touch control display apparatus is operated in a time-division mode. The time-division mode includes a display mode and a fingerprint detection mode. Optionally, the time-division mode further includes a touch sensing mode. The plurality of light sources 10 (e.g., the plurality of light emitting elements) are configured to display an image during the display mode. One or more of the plurality of light sources 10 (e.g., the plurality of light emitting elements) are configured to provide a light source for one or more of the plurality of photosensors 20 in the fingerprint detection mode and optionally in the touch sensing mode.

In one example, the integrated fingerprint detection touch control display apparatus has a display panel of a 5.5" size. Referring to FIG. 1, FIG. 3A, and FIG. 3B, the width of the display panel along the column direction (e.g., the extending direction of the plurality of read lines RL) is approximately 122 mm. The integrated fingerprint detection touch control display apparatus in one example may be divided into 32 sensing regions (e.g., 32 of the plurality of sensing regions SR), each sensing region spanning a width of approximately 3.8 mm. In one example, the integrated fingerprint detection touch control display apparatus includes 2560 numbers of gate scanning lines. In each of the 32 sensing regions, there are approximately 80 gate scanning lines, connected to a respective one of the plurality of fingerprint sensing driver circuits FIC.

Referring to FIG. 1, a fingerprint typically has a width of approximately 12 mm, thus it occupies three directly adjacent consecutive sensing regions of the plurality of sensing regions SR. When performing fingerprint detection, three independent fingerprint sensing driver circuits of the plurality of fingerprint sensing driver circuits FTC corresponding to the three directly adjacent consecutive sensing regions of the plurality of sensing regions SR are configured to independently detect fingerprint information in three directly adjacent consecutive sensing regions of the plurality of sensing regions SR in the integrated fingerprint detection touch control display apparatus. The fingerprint information detected in the three directly adjacent consecutive sensing regions of the plurality of sensing regions SR is then integrated together to provide complete fingerprint information. The fingerprint sensing driver circuits of the plurality of fingerprint sensing driver circuits FIC in other sensing regions of the plurality of sensing regions SR can be in an idle state, thereby reducing power consumption, computational demand, and making the fingerprint detection faster and more accurate. The power consumption and time required to detect the fingerprint can be reduced by as much as 90%.

In some embodiments, the plurality of second gate lines G2 are respectively from the plurality of sensing regions SR, each of the plurality of sensing regions SR having at least one of the plurality of second gate lines G2 passing therethrough. Referring to FIG. 3A and FIG. 3B, the plurality of second gate lines G2 are from the plurality of sensing regions SR respectively. In one example, a scanning frequency for the touch detection is approximately 120 Hz, e.g., the time required for performing the touch detection in a display panel of 5.5" size is approximately 8.3 milliseconds. The time required for turning on and off a photosensor is approximately 50 μs. To achieve a scanning frequency of 8.3 milliseconds, a total number of 166 gate lines of the plurality of second gate lines G2 is required, distributed evenly in a total number of 32 sensing regions of the plurality of sensing regions SR. For example, each of the 32 sensing regions has a total number of 5 gate lines for detecting touch.

Optionally, each of the plurality of sensing regions SR has N numbers of the plurality of second gate lines G2 passing there-through, N is a positive integer. Optionally, N is in a range of 1 to 20, e.g., 1 to 15, 1 to 10, 1 to 5, 5 to 10, 10 to 15, and 15 to 20. Optionally, each of the plurality of sensing regions SR has a same number of the plurality of second gate lines G2 passing there-through. Optionally, the numbers of the plurality of second gate lines G2 passing through at least two of the plurality of sensing regions SR are different from each other.

Figure 5:
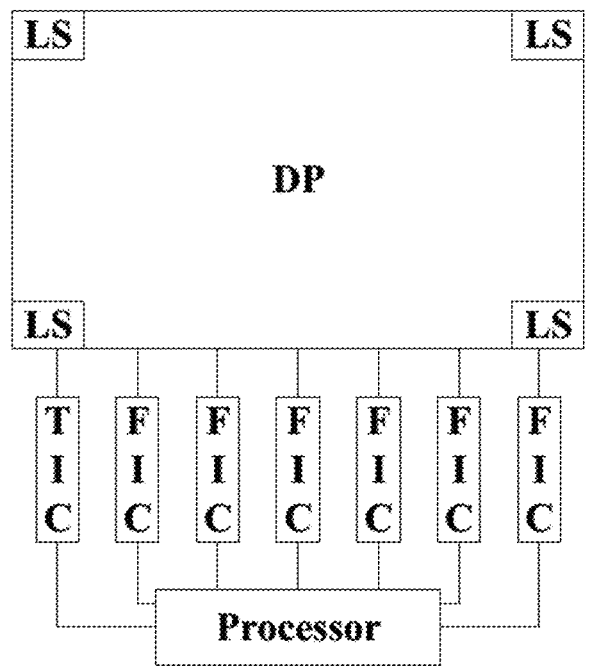
FIG. 5 is a schematic diagram illustrating the structure of an integrated fingerprint detection touch control display apparatus in some embodiments according to the present disclosure.

In some embodiments, multiple ones of the plurality of photosensors 20 corresponding to the plurality of second gate lines G2 are configured to detect the touch by detecting an image of a touch object. FIG. 5 is a schematic diagram illustrating the structure of an integrated fingerprint detection touch control display apparatus in some embodiments according to the present disclosure. Referring to FIG. 5, the integrated fingerprint detection touch control display apparatus in some embodiments further includes a processor connected to the plurality of fingerprint sensing driver circuits FTC and the touch sensing driver circuit TIC. Multiple ones of the plurality of photosensors 20 corresponding to the plurality of second gate lines G2 are configured to detect an image of a touch object placed on a screen of a display panel DP (or a touch panel). The processor is configured to analyze the image detected by the multiple ones of the plurality of photosensors 20.

Figure 6:
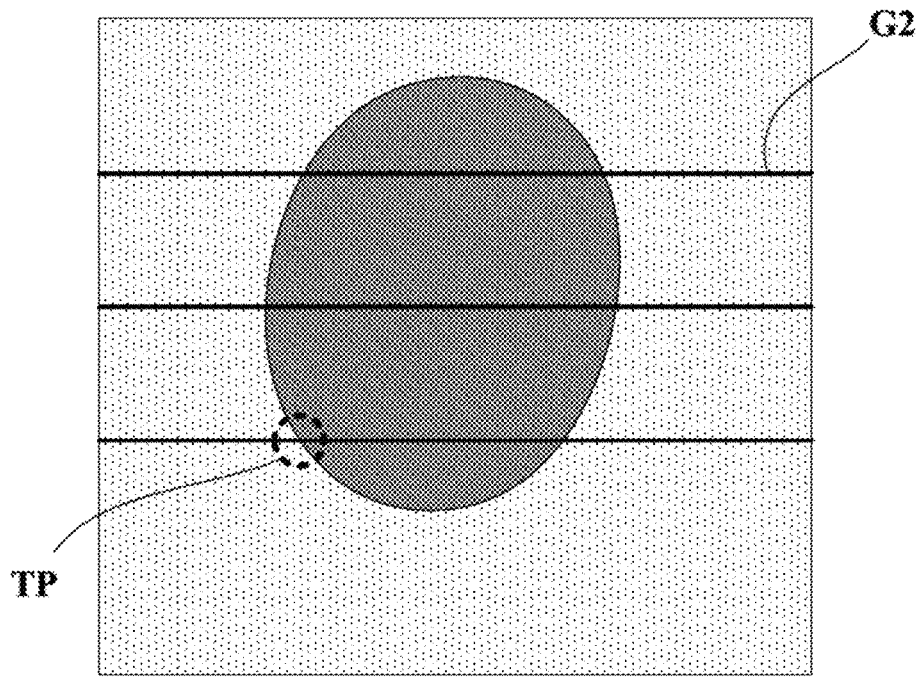
FIG. 6 illustrates an image of a touch object detected by an integrated fingerprint detection touch control display apparatus in some embodiments according to the present disclosure.

FIG. 6 illustrates an image of a touch object detected by an integrated fingerprint detection touch control display apparatus in some embodiments according to the present disclosure. As shown in FIG. 6, the image of the touch object spans across three second gate lines of the plurality of second gate lines G2. At the boundary of the image of the touch object, the level of signal undergoes a transition, e.g., from a high level to a low level, or in some cases, from a low level to a high level. The processor analyzes the image of the touch object, and identifies a plurality of transition points TP at the boundary where the level of signal undergoes the transition. The processor then fits the plurality of transition points TP to derive a central point of the image of the touch object, thereby determining a touch position.

Optionally, the three second gate lines of the plurality of second gate lines G2 are only connected to the touch sensing driver circuit TIC, but not connected to the plurality of fingerprint sensing driver circuits FIC (as shown in FIG. 3A). Optionally, the three second gate lines of the plurality of second gate lines G2 connected to the touch sensing driver circuit TIC and configured to detect a touch in a touch sensing mode, and are connected to multiple ones of the plurality of fingerprint sensing driver circuits FIC and configured to detect fingerprint information in a fingerprint detection mode (as shown in FIG. 3B).

Figure 7:
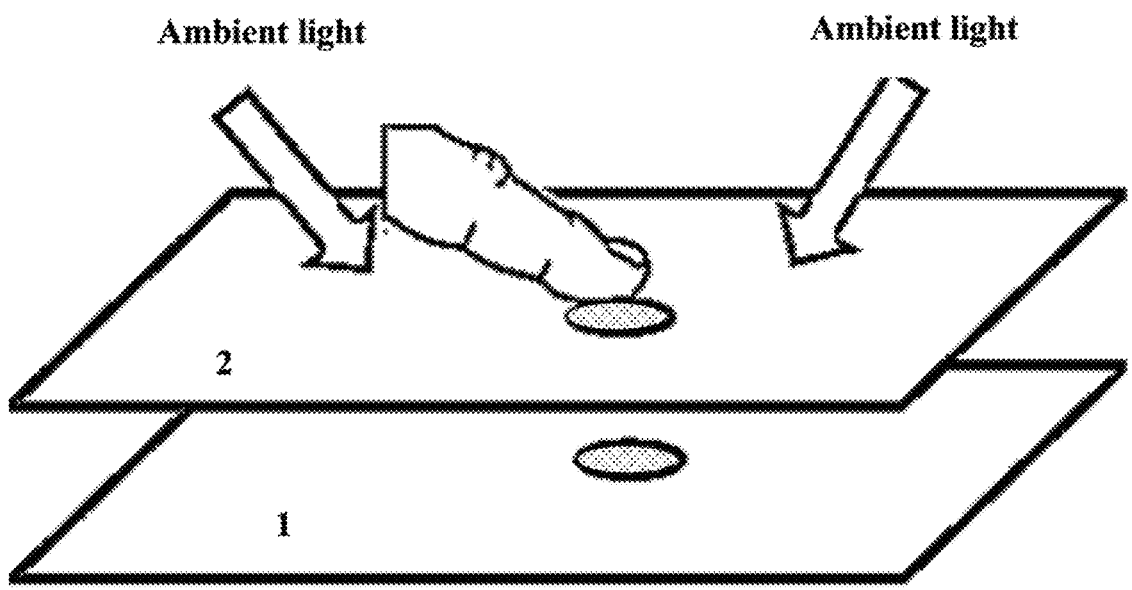
FIG. 7 illustrates a process of detecting an image of a touch object using ambient light as a light source in some embodiments according to the present disclosure.

In some embodiments, the multiple ones of the plurality of photosensors 20 corresponding to the plurality of second gate lines G2 are configured to detect the touch by detecting an image of a touch object using ambient light as a light source. FIG. 7 illustrates a process of detecting an image of a touch object using ambient light as a light source in some embodiments according to the present disclosure. When a light intensity of ambient light is relatively high, e.g., during daylight time or in a well-illuminated room, the plurality of photosensors in the integrated fingerprint detection touch control display apparatus are detecting a signal of a relatively high level. Referring to FIG. 7, a finger is placed on a touch screen of the integrated fingerprint detection touch control display apparatus, e.g., on a surface of the counter substrate 2. The light transmission rate of a touch object such as a finger is extremely low, e.g., only as much as 2%. Accordingly, a dark region corresponding to the touch object is formed in the image of the touch object. Multiple ones of the plurality of photosensors in the dark region detects a signal of a much lower level. Referring to FIG. 6, a plurality of transition points TP can be identified at the boundary of the dark region, and a touch position can be derived based on positions of the plurality of transition points TP.

In some embodiments, the multiple ones of the plurality of photosensors 20 corresponding to the plurality of second gate lines G2 are configured to detect the touch by detecting an image of a touch object using light emitted from multiple ones of the plurality of light sources 10 as a light source. When a light intensity of ambient light is relatively low, e.g., during night time and in a poorly-illuminated space, the plurality of photosensors in the integrated fingerprint detection touch control display apparatus are detecting a signal of a relatively low level. Thus, to detect an image of a touch object, an active light source is needed. In some embodiments, the plurality of light sources 10 can be used as the active light source. Light emitted from multiple ones of the plurality of light sources 10 is reflected by the touch object placed on the touch screen, thereby forming a bright region in the image, and regions outside the touch object forming a dark region. A plurality of transition points TP can be identified at the boundary of the bright region, and a touch position can be derived based on positions of the plurality of transition points TP.

Figure 8A:
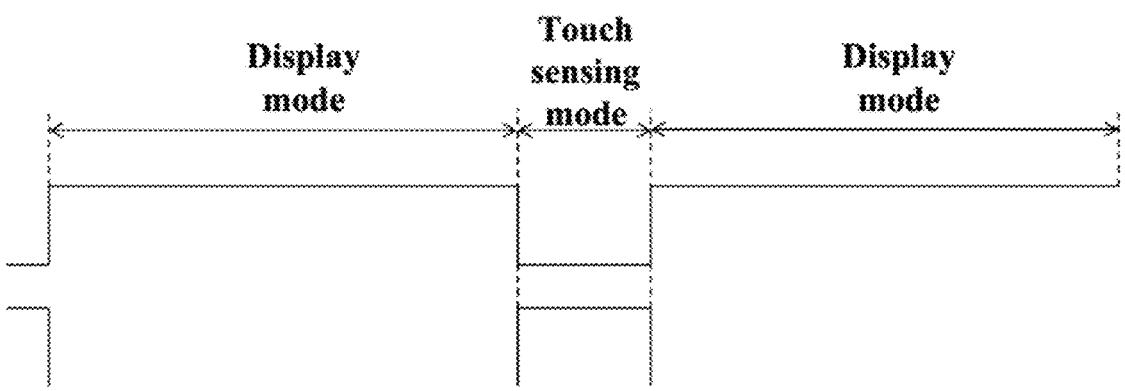
FIG. 8A illustrates a time-division operation mode of an integrated fingerprint detection touch control display apparatus in some embodiments according to the present disclosure.

In some embodiments, the integrated fingerprint detection touch control display apparatus is operated in a time-division mode. FIG. 8A illustrates a time-division operation mode of an integrated fingerprint detection touch control display apparatus in some embodiments according to the present disclosure. Referring to FIG. 8A, in some embodiments, the time-division mode includes a display mode and a touch sensing mode. The integrated fingerprint detection touch control display apparatus is configured to display an image during the display mode. The plurality of light sources are configured to display an image having a grayscale higher than a threshold value for providing light for detecting the image of the touch object. For example, the plurality of light sources may display an image having a fixed grayscale higher than the threshold value, thus providing a stable illumination for detecting an image of the touch object.

Referring to FIG. 5, in some embodiments, the integrated fingerprint detection touch control display apparatus further includes one or more light sensors LS configured to detect a light intensity of ambient light. The processor is configured to determine whether the light intensity of ambient light is lower than a threshold value. In some embodiments, in response to the light intensity of ambient light being no less than the threshold value, multiple ones of the plurality of photosensors corresponding to the plurality of second gate lines are configured to detect the touch by detecting an image of a touch object using ambient light as a light source. In some embodiments, in response to the light intensity of ambient light being below a threshold value, multiple ones of the plurality of photosensors corresponding to the plurality of second gate lines are configured to detect the touch by detecting an image of a touch object using light emitted from multiple ones of the plurality of light sources as a light source.

In some embodiments, fingerprint detection is selectively performed in one or more of the plurality of sensing regions, and not performed in the remaining regions of the plurality of sensing regions. In one example, the processor is configured to determine a touch region in which the touch occurs, as discussed above. Subsequently, based on the touch position, the processor is configured to determine one or more active fingerprint sensing driver circuits out of the plurality of fingerprint sensing driver circuits. Each of the one or more active fingerprint sensing driver circuits is connected to at least one gate line of the plurality of first gate lines passing through the touch region. Optionally, the touch region is a dark region in the image of the touch object (e.g., when using ambient light as a light source). Optionally, the touch region is a bright region in the image of the touch object (e.g., when using the plurality of light sources as illumination light).

In one example, the integrated fingerprint detection touch control display apparatus is operated in a time-division mode. In a touch sensing mode (e.g., in a previous frame of image), the processor is configured to determine a touch region in which the touch occurs. In a fingerprint detection mode, the processor is configured to determine one or more active fingerprint sensing driver circuits out of the plurality of fingerprint sensing driver circuits based on the touch position determined in the touch sensing mode.

Figure 8B:
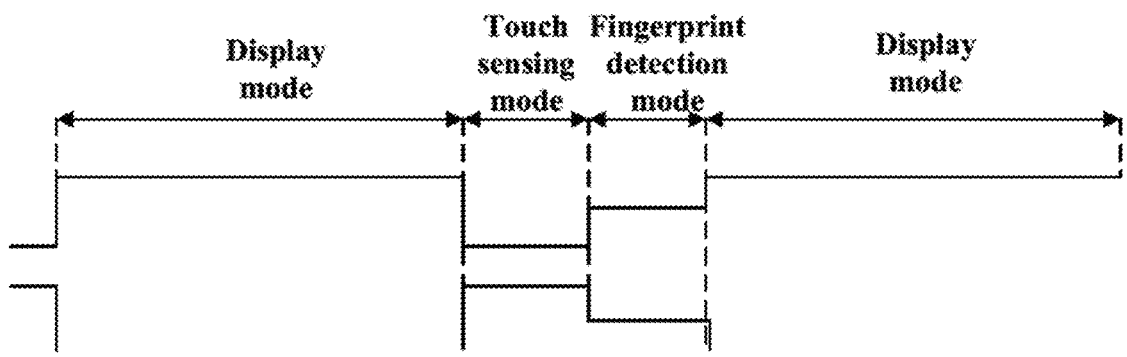
FIG. 8B illustrates a time-division operation mode of an integrated fingerprint detection touch control display apparatus in some embodiments according to the present disclosure.
Figure 8C:
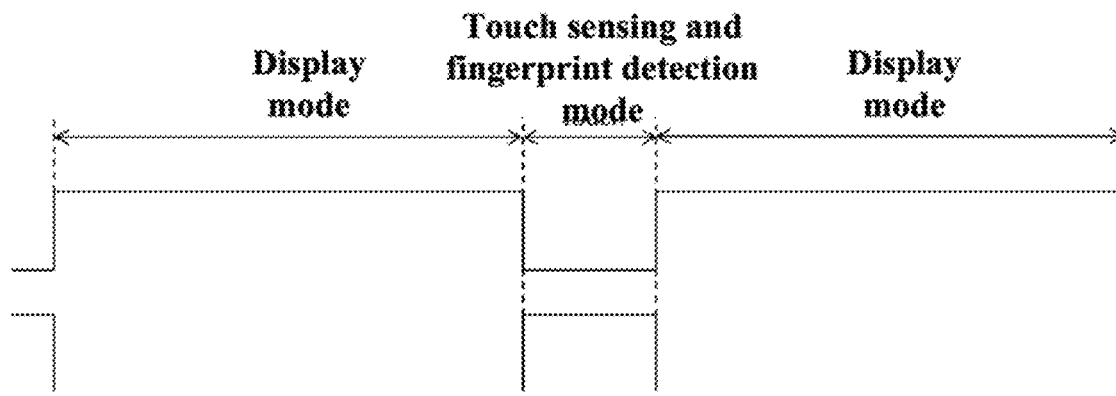
FIG. 8C illustrates a time-division operation mode of an integrated fingerprint detection touch control display apparatus in some embodiments according to the present disclosure.

FIG. 8B illustrates a time-division operation mode of an integrated fingerprint detection touch control display apparatus in some embodiments according to the present disclosure. Referring to FIG. 8B, the integrated fingerprint detection touch control display apparatus is operated in a time-division mode including a display mode, a touch sensing mode, and a fingerprint detection mode. Optionally, and referring to FIG. 8B, the touch sensing mode and the fingerprint detection mode are two distinct modes occurring in two different non-overlapping time frames. Optionally, the touch sensing mode and the fingerprint detection mode occurs in two partially overlapping time frames. FIG. 8C illustrates a time-division operation mode of an integrated fingerprint detection touch control display apparatus in some embodiments according to the present disclosure. Referring to FIG. 8C, optionally, the touch sensing mode and the fingerprint detection mode occurs substantially simultaneously, e.g., at the same time. In this case, the touch sensing mode and the fingerprint detection mode become an integrated touch sensing and fingerprint detection mode.

Once the one or more active fingerprint sensing driver circuits are determined, the one or more active fingerprint sensing driver circuits are configured to provide gate scanning signals to multiple rows of the plurality rows of the plurality of photosensor driving thin film transistors connected to the one or more active fingerprint sensing driver circuits, thereby detecting fingerprint information.

In some embodiments, the processor is further configured to determine one or more idle fingerprint sensing driver circuits out of the plurality of fingerprint sensing driver circuits. Gate lines connected to the one or more idle fingerprint sensing driver circuits pass through a region outside the touch region. The one or more idle fingerprint sensing driver circuits are configured not to provide gate scanning signals.

Figure 9:
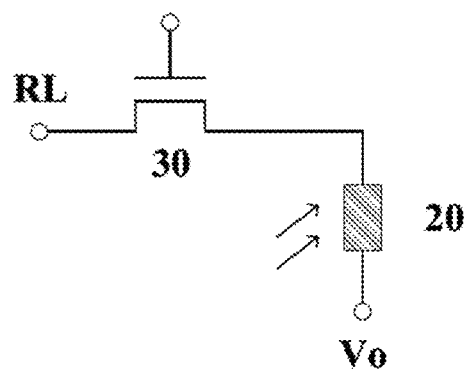
FIG. 9 is a circuit diagram of a photo-sensing unit in some embodiments according to the present disclosure.
Figure 10:
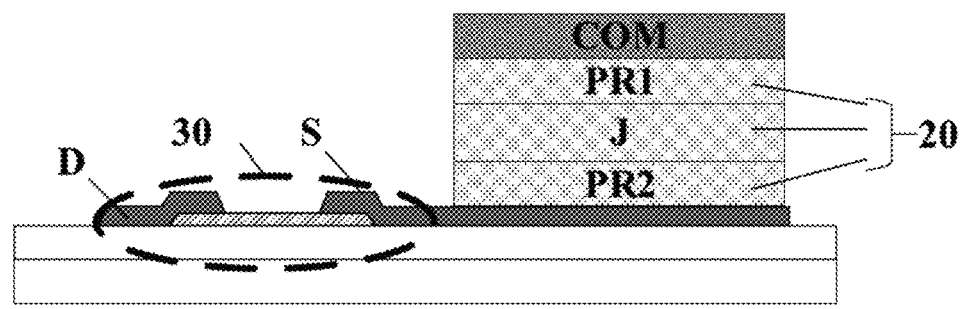
FIG. 10 is a schematic diagram illustrating the structure of a photo-sensing unit in some embodiments according to the present disclosure.

FIG. 9 is a circuit diagram of a photo-sensing unit in some embodiments according to the present disclosure. FIG. 10 is a schematic diagram illustrating the structure of a photo-sensing unit in some embodiments according to the present disclosure. Referring to IG. 9 and FIG. 10, each photo-sensing unit includes one of a plurality of photosensor driving thin film transistors 30 electrically connected to one of the plurality of photosensors 20. The source electrode S of the one of the plurality of photosensor driving thin film transistors 30 is electrically connected to a first terminal of the one of the plurality of photosensors 20. The drain electrode D of the one of the plurality of photosensor driving thin film transistors 30 is electrically connected to one of a plurality of read line RL. A second terminal of the one of the plurality of photosensors 20 is provided with a common voltage Vo (e.g., a low voltage, e.g., −5 V to 0 V).

Various appropriate photosensors having a diode junction may be utilized in making and using the present display apparatus. In some embodiments, the photosensor is a photosensor having a diode junction. Examples of photosensors having a diode junction include, but are not limited to, a PN photodiode, a PIN photodiode, an avalanche photodiode, a MIM diode junction, a MIS diode junction, a MOS diode junction, a SIS diode junction, and a MS diode junction.

Referring to FIG. 10, each of the plurality of photosensors 20 in some embodiments includes a first polarity region PR1 connected to a common electrode COM, a second polarity region PR2 connected to a source electrode S of one of the photosensor driving thin film transistors 30, and a diode junction J connecting the first polarity region PR1 and the second polarity region PR2. As used herein, the term diode junction refers to a junction that can exhibit current rectification, e.g., a junction that exhibits drastically different conductivities in one bias direction relative to the other.

Optionally, each of the plurality of photosensors 20 having a diode junction includes a first polarity region having a first dopant, a second polarity region having a second dopant, and a diode junction connecting the first polarity region and the second polarity region. Optionally, each of the plurality of photosensors 20 having a diode junction is reversely biased when the first polarity region is connected to a low voltage and the second polarity region is connected to a high voltage. For example, the photosensor having a diode junction is in a reversely biased state when the first polarity region is connected to a common electrode (low voltage, e.g., −5 V to 0 V). In some embodiments, each of the plurality of photosensors 20 having a diode junction is a PN photodiode having a P+ doping semiconductor region as the first polarity region and an N+ doping semiconductor region as the second polarity region. In some embodiments, each of the plurality of photosensors 20 having a diode junction is a PIN photodiode having a P+ doping semiconductor region as the first polarity region, an N+ doping semiconductor region as the second polarity region, and an intrinsic region of amorphous silicon between the P+ doping semiconductor region and the N+ doping semiconductor region.

In some embodiments, the integrated fingerprint detection touch control display apparatus has a plurality of subpixels. Optionally, each subpixel of the plurality of subpixels includes one of the plurality of photosensors 20. Optionally, not every subpixel includes one of the plurality of photosensors 20, but only one out of several subpixels includes one of the plurality of photosensors 20 in one of the plurality of subpixels.

In some embodiments, the plurality of photosensors 20 are in an inter-subpixel region of the integrated fingerprint detection touch control display apparatus. As used herein, a subpixel region refers to a light emission region of a subpixel, such as a region corresponding to a pixel electrode in a liquid crystal display, a region corresponding to a light emissive layer in an organic light emitting diode display panel, or a region corresponding to the light transmission layer in the present disclosure. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel. As used herein, an inter-subpixel region refers to a region between adjacent subpixel regions, such as a region corresponding to a black matrix in a liquid crystal display, a region corresponding a pixel definition layer in an organic light emitting diode display panel, or a black matrix in the present display panel. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

In some embodiments, the processor is a logical operation apparatus having data processing capabilities and/or program execution capabilities, such as Central Processing Unit (CPU), Field-Programmable Gate Array (FPGA), Microcontroller Unit (MCU), Digital Signal Processor (DSP), Application-Specific Integrated Circuit (ASIC), graphics processing unit (GPU).

In some embodiments, the integrated fingerprint detection touch control display apparatus further include a memory. In some embodiments, the memory is a non-transitory computer readable storage medium. There are computer programs stored in the non-transitory computer readable storage medium, when the computer programs are executed by the processor, an integrated method of fingerprint detection, touch control, and image display can be performed.

Examples of appropriate integrated fingerprint detection touch control display apparatus include, but are not limited to, an electronic paper, a mobile phone, a tablet computer, a television, a monitor, a notebook computer, a digital album, a GPS, etc.

In another aspect, the present disclosure provides an integrated method of fingerprint detection, touch control, and image display. In some embodiments, the method includes independently controlling fingerprint detection respectively in a plurality of sensing regions in an integrated fingerprint detection touch control display apparatus by a plurality of fingerprint sensing driver circuits respectively; and controlling touch detection in the integrated fingerprint detection touch control display apparatus by a touch sensing driver circuit. Optionally, the step of independently controlling fingerprint detection and controlling touch detection includes emitting light using a plurality of light sources in an array substrate of the integrated fingerprint detection touch control display apparatus toward a counter substrate facing the array substrate, at least a portion of the light being totally reflected by a surface of the counter substrate facing away the army substrate; detecting the at least the portion of the light being totally reflected by the surface of the counter substrate facing away the army substrate using a plurality of photosensors, thereby detecting a fingerprint information; and providing gate scanning signals respectively to a plurality of rows of a plurality of photosensor driving thin film transistors respectively connected to the plurality of photosensors in the plurality of rows. In each of the plurality of sensing regions, the method further includes providing gate scanning signals from the plurality of fingerprint sensing driver circuits respectively through a plurality of first gate lines of the plurality of gate scanning lines, for independently detecting fingerprint information in each of the plurality of sensing regions.

In some embodiments, the fingerprint detection is selectively performed in one or more of the plurality of sensing regions and not in the remaining ones of the plurality of the sensing regions. When a selected sensing region of the plurality of sensing regions is selected for fingerprint detection, the method includes emitting light using a plurality of light sources in the selected sensing region of the array substrate of the integrated fingerprint detection touch control display apparatus toward the counter substrate facing the array substrate, at least a portion of the light being totally reflected by a surface of the counter substrate facing away the array substrate; detecting the at least the portion of the light being totally reflected by the surface of the counter substrate facing away the array substrate using multiple ones of a plurality of photosensors in the selected sensing region, thereby detecting a fingerprint information in the selected sensing region; and providing gate scanning signals respectively to multiples rows of the plurality of rows of the plurality of photosensor driving thin film transistors respectively connected to the multiple ones of the plurality of photosensors in the plurality of rows in the selected sensing region. Optionally, the step of providing gate scanning signals to the selected sensing region includes providing gate scanning signals from multiple ones of the plurality of fingerprint sensing driver circuits corresponding to the selected sensing region respectively through multiple ones of the plurality of first gate lines of the plurality of gate scanning lines passing through the selected sensing region, for detecting fingerprint information in the selected sensing region.

In the present method, gate scanning signals from a same one of the plurality of fingerprint sensing driver circuits are provided to gate lines of the plurality of first gate lines passing through a same one of the plurality of sensing regions; and gate scanning signals from different ones of the plurality of fingerprint sensing driver circuits are provided to gate lines of the plurality of first gate lines passing through different ones of the plurality of sensing regions. For example, gate scanning signals from a same one of the plurality of fingerprint sensing driver circuits are provided to gate lines of the plurality of first gate lines passing through the selected sensing region of the plurality of sensing regions.

For detecting a touch, the method further includes providing second gate scanning signals from the touch sensing driver circuit to a plurality of second gate lines of the plurality of gate scanning lines respectively, for detecting a touch. Optionally, the second gate scanning signals are provided to the plurality of second gate lines respectively in the plurality of sensing regions, each of the plurality of sensing regions having at least one of the plurality of second gate lines passing there-through.

In some embodiments, the step of detecting the touch includes detecting an image of a touch object by multiple ones of the plurality of photosensors corresponding to the plurality of second gate lines. Optionally, detecting the image of the touch object is performed using ambient light as a light source. Optionally, detecting the image of the touch object is performed using light emitted from multiple ones of the plurality of light sources as a light source.

In some embodiments, the method includes operating the integrated fingerprint detection touch control display apparatus in a time-division mode. The time-division mode includes a display mode and a touch sensing mode. The method further includes displaying an image during the display mode; and displaying an image having a grayscale higher than a threshold value by the plurality of light sources for providing light for detecting the image of the touch object.

In some embodiments, the method further includes detecting a light intensity of ambient light by one or more light sensors. In response to the light intensity of ambient light being no less than a threshold value, the method further includes detecting an image of a touch object by multiple ones of the plurality of photosensors corresponding to the plurality of second gate lines using ambient light as a light source. In response to the light intensity of ambient light being below a threshold value, the method further includes detecting an image of a touch object using light emitted from multiple ones of the plurality of light sources as a light source by multiple ones of the plurality of photosensors corresponding to the plurality of second gate lines.

In some embodiments, subsequent to detecting the touch, the method further includes determining a touch region in which the touch occurs; and determining one or more active fingerprint sensing driver circuits out of the plurality of fingerprint sensing driver circuits, each of the one or more active fingerprint sensing driver circuits is connected to at least one gate line of the plurality of first gate lines passing through the touch region; and providing gate scanning signals by the one or more active fingerprint sensing driver circuits to multiple rows of the plurality rows of the plurality of photosensor driving thin film transistors connected to the one or more active fingerprint sensing driver circuits. Optionally, the method further includes determining one or more idle fingerprint sensing driver circuits out of the plurality of fingerprint sensing driver circuits. Gate lines connected to the one or more idle fingerprint sensing driver circuits pass through a region outside the touch region. The one or more idle fingerprint sensing driver circuits are configured not to provide gate scanning signals.

In some embodiments, the method further includes transmitting fingerprint information from a plurality of read lines respectively connected to drain electrodes of the plurality of photosensor driving thin film transistors in a respective row of the plurality rows.

In another aspect, the present disclosure provides a method of fabricating an integrated fingerprint detection touch control display apparatus. In some embodiments, the method includes forming a display panel including an array substrate and a counter substrate facing the array substrate, forming a plurality of fingerprint sensing driver circuits respectively configured to independently control fingerprint detection respectively in a plurality of sensing regions in the integrated fingerprint detection touch control display apparatus; and forming a touch sensing driver circuit configured to control touch detection in the integrated fingerprint detection touch control display apparatus. Optionally, forming the array substrate includes forming a plurality of light sources configured to emit light toward the counter substrate, at least a portion of the light being totally reflected by a surface of the counter substrate facing away the array substrate, forming a plurality of photosensors configured to detect the at least the portion of the light being totally reflected by the surface of the counter substrate facing away the array substrate, thereby detecting a fingerprint information; forming a plurality of photosensor driving thin film transistors respectively connected to the plurality of photosensors, the plurality of photosensor driving thin film transistors and the plurality of photosensors being arranged in a plurality of rows; and forming a plurality of gate scanning lines respectively connected to the plurality of rows of the plurality of photosensor driving thin film transistors for providing gate scanning signals to the plurality of photosensor driving thin film transistors. Optionally, forming the plurality of gate scanning lines includes forming a plurality of first gate lines respectively connected to the plurality of fingerprint sensing driver circuits for independently detecting fingerprint information in each of the plurality of sensing regions, and forming a plurality of second gate lines connected to the touch sensing driver circuit for detecting a touch.

Optionally, gate lines of the plurality of first gate lines passing through a same one of the plurality of sensing regions are formed to be connected to a same one of the plurality of fingerprint sensing driver circuits; and gate lines of the plurality of first gate lines passing through different ones of the plurality of sensing regions are formed to be respectively connected to different ones of the plurality of fingerprint sensing driver circuits. Optionally, the plurality of second gate lines are formed so that the plurality of second gate lines are respectively from the plurality of sensing regions, each of the plurality of sensing regions having at least one of the plurality of second gate lines passing there-through.

In some embodiments, the method further includes forming one or more light sensors configured to detect a light intensity of ambient light.

In some embodiments, the method further includes forming a processor configured to determine a touch region in which the touch occurs, and determine one or more active fingerprint sensing driver circuits out of the plurality of fingerprint sensing driver circuits, each of the one or more active fingerprint sensing driver circuits is connected to at least one gate line of the plurality of first gate lines passing through the touch region. Optionally, the processor is further configured to determine one or more idle fingerprint sensing driver circuits out of the plurality of fingerprint sensing driver circuits, gate lines connected to the one or more idle fingerprint sensing driver circuits passing through a region outside the touch region.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An integrated fingerprint detection touch control display apparatus, comprising:
a plurality of fingerprint sensing driver circuits respectively configured to independently control fingerprint detection respectively in a plurality of sensing regions in the integrated fingerprint detection touch control display apparatus;
a touch sensing driver circuit configured to control touch detection in a touch detection region in the integrated fingerprint detection touch control display apparatus, the touch detection region comprising the plurality of sensing regions; and
an array substrate;
wherein the array substrate comprises:
one or more light sources;
a plurality of photosensors;
a plurality of photosensor driving thin film transistors respectively connected to the plurality of photosensors arranged in a plurality of rows; and
a plurality of gate scanning lines respectively connected to the plurality of rows of the plurality of photosensor driving thin film transistors; and
wherein the plurality of gate scanning lines comprise a plurality of first gate lines respectively connected to the plurality of fingerprint sensing driver circuits for independently detecting fingerprint information in each of the plurality of sensing regions, respectively, and a plurality of second gate lines connected to the touch sensing driver circuit for detecting a touch throughout the plurality of sensing regions; and a respective fingerprint sensing driver circuit of the plurality of fingerprint sensing driver circuits is connected to multiple rows of photosensor driving thin film transistors in a respective sensing region of the plurality of sensing regions.

2. The integrated fingerprint detection touch control display apparatus of claim 1, wherein multiple gate lines of the plurality of first gate lines passing through a same one of the plurality of sensing regions are connected to a same one of the plurality of fingerprint sensing driver circuits; and
gate lines of the plurality of first gate lines passing through different ones of the plurality of sensing regions are respectively connected to different ones of the plurality of fingerprint sensing driver circuits.

3. The integrated fingerprint detection touch control display apparatus of claim 1, wherein the plurality of second gate lines are respectively from the plurality of sensing regions, each of the plurality of sensing regions having at least one of the plurality of second gate lines passing there-through.

4. The integrated fingerprint detection touch control display apparatus of claim 1, wherein multiple ones of the plurality of photosensors corresponding to the plurality of second gate lines are configured to detect the touch by detecting an image of a touch object using ambient light as a light source.

5. The integrated fingerprint detection touch control display apparatus of claim 1, wherein multiple ones of the plurality of photosensors corresponding to the plurality of second gate lines are configured to detect the touch by detecting an image of a touch object using light emitted from multiple ones of the one or more light sources as a light source.

6. The integrated fingerprint detection touch control display apparatus of claim 5, wherein the integrated fingerprint detection touch control display apparatus is operated in a time-division mode comprising a display mode and a touch sensing mode;

the integrated fingerprint detection touch control display apparatus is configured to display an image during the display mode; and the plurality of light sources are configured to display an image having a grayscale higher than a threshold value for providing light for detecting the image of the touch object.

7. The integrated fingerprint detection touch control display apparatus of claim 1, further comprising one or more light sensors configured to detect a light intensity of ambient light;

wherein, in response to the light intensity of ambient light being no less than a threshold value, multiple ones of the plurality of photosensors corresponding to the plurality of second gate lines are configured to detect the touch by detecting an image of a touch object using ambient light as a light source; and wherein, in response to the light intensity of ambient light being below a threshold value, multiple ones of the plurality of photosensors corresponding to the plurality of second gate lines are configured to detect the touch by detecting an image of a touch object using light emitted from multiple ones of the one or more light sources as a light source.

8. The integrated fingerprint detection touch control display apparatus of claim 1, further comprising a processor configured to determine a touch region in which the touch occurs, and determine one or more active fingerprint sensing driver circuits out of the plurality of fingerprint sensing driver circuits, a respective one of the one or more active fingerprint sensing driver circuits is connected to multiple gate lines of the plurality of first gate lines passing through the touch region;

wherein the respective one of the one or more active fingerprint sensing driver circuits are configured to provide gate scanning signals to multiple rows of the plurality rows of the plurality of photosensor driving thin film transistors connected to the respective one of the one or more active fingerprint sensing driver circuits.

9. The integrated fingerprint detection touch control display apparatus of claim 8, wherein, upon determination of the touch region in which the touch occurs, the processor is further configured to determine multiple sensing regions out of the plurality of sensing regions as idle regions, the idle regions being outside the touch region;

wherein fingerprint sensing driver circuits in the idle regions are configured not to provide gate scanning signals at once upon determination of the touch region.

10. The integrated fingerprint detection touch control display apparatus of claim 1, wherein the plurality of sensing regions are sequentially arranged along a direction perpendicular to the plurality of gate scanning lines.

11. The integrated fingerprint detection touch control display apparatus of claim 1, wherein the plurality of second gate lines are respectively further connected to the plurality of fingerprint sensing driver circuits;

wherein the integrated fingerprint detection touch control display apparatus is operated in a time-division mode comprising a touch sensing mode and a fingerprint detection mode;

the plurality of second gate lines in the touch sensing mode are configured to detect a touch; and the plurality of first gate lines and the plurality of second gate lines in the fingerprint detection mode are configured to detect fingerprint information.

12. An integrated method of fingerprint detection, touch control, and image display, comprising:

independently controlling fingerprint detection respectively in a plurality of sensing regions in an integrated fingerprint detection touch control display apparatus by a plurality of fingerprint sensing driver circuits respectively; and controlling touch detection in a touch detection region in the integrated fingerprint detection touch control display apparatus by a touch sensing driver circuit, the touch detection region comprising the plurality of sensing regions;

wherein independently controlling fingerprint detection and controlling touch detection comprise:

emitting light using one or more light sources in an array substrate of the integrated fingerprint detection touch control display apparatus detecting a fingerprint information using a plurality of photosensors; and providing gate scanning signals respectively to a plurality of rows of a plurality of photosensor driving thin film transistors respectively connected to the plurality of photosensors in the plurality of rows;

wherein providing gate scanning signals comprises:

providing gate scanning signals from the plurality of fingerprint sensing driver circuits respectively through a plurality of first gate lines of the plurality of gate scanning lines, for independently detecting fingerprint information in the plurality of sensing regions, respectively; and providing second gate scanning signals from the touch sensing driver circuit to a plurality of second gate lines of the plurality of gate scanning lines respectively, for detecting a touch throughout the plurality of sensing regions;

wherein a respective fingerprint sensing driver circuit of the plurality of fingerprint sensing driver circuits is connected to first gate lines driving thin film transistors in a respective sensing region of the plurality of sensing regions.

13. The method of claim 12, wherein gate scanning signals from a same one of the plurality of fingerprint sensing driver circuits are provided to multiple gate lines of the plurality of first gate lines passing through a same one of the plurality of sensing regions; and gate scanning signals from different ones of the plurality of fingerprint sensing driver circuits are provided to gate lines of the plurality of first gate lines passing through different ones of the plurality of sensing regions.

14. The method of claim 12, wherein the second gate scanning signals are provided to the plurality of second gate lines respectively in the plurality of sensing regions, each of the plurality of sensing regions having at least one of the plurality of second gate lines passing there-through.

15. The method of claim 12, wherein detecting the touch comprises detecting an image of a touch object by multiple ones of the plurality of photosensors corresponding to the plurality of second gate lines using ambient light as a light source.

16. The method of claim 12, wherein detecting the touch comprises detecting an image of a touch object by multiple ones of the plurality of photosensors corresponding to the plurality of second gate lines using light emitted from multiple ones of the one or more light sources as a light source.

17. The method of claim 16, further comprising operating the integrated fingerprint detection touch control display apparatus in a time-division mode comprising a display mode and a touch sensing mode;
 displaying an image during the display mode; and
 displaying an image having a grayscale higher than a threshold value by the one or more light sources for providing light for detecting the image of the touch object.

18. The method of claim 12, further comprising detecting a light intensity of ambient light by one or more light sensors;
 in response to the light intensity of ambient light being no less than a threshold value, detecting the touch comprises detecting an image of a touch object by multiple ones of the plurality of photosensors corresponding to the plurality of second gate lines using ambient light as a light source; and
 in response to the light intensity of ambient light being below a threshold value, detecting an image of a touch object using light emitted from multiple ones of the one or more light sources as a light source by multiple ones of the plurality of photosensors corresponding to the plurality of second gate lines using ambient light as a light source.

19. The method of claim 12, subsequent to detecting the touch, further comprising:
 determining a touch region in which the touch occurs;
 determining one or more active fingerprint sensing driver circuits out of the plurality of fingerprint sensing driver circuits, a respective one of the one or more active fingerprint sensing driver circuits is connected to multiple gate lines of the plurality of first gate lines passing through the touch region; and
 providing gate scanning signals by the respective one of the one or more active fingerprint sensing driver circuits to multiple rows of the plurality rows of the plurality of photosensor driving thin film transistors connected to the respective one of the one or more active fingerprint sensing driver circuits.

20. The method of claim 12, further comprising operating the integrated fingerprint detection touch control display apparatus in a time-division mode comprising a touch sensing mode and a fingerprint detection mode;
 wherein providing the second gate scanning signals from the touch sensing driver circuit is performed in the touch sensing mode; and
 providing the gate scanning signals from the plurality of fingerprint sensing driver circuits is performed in the fingerprint detection mode;
 wherein providing the gate scanning signals from the plurality of fingerprint sensing driver circuits comprises providing the gate scanning signals from the plurality of fingerprint sensing driver circuits respectively through the plurality of first gate lines and the plurality of second gate lines of the plurality of gate scanning lines, for independently detecting fingerprint information in each of the plurality of sensing regions.

\* \* \* \* \*